Figure 1:
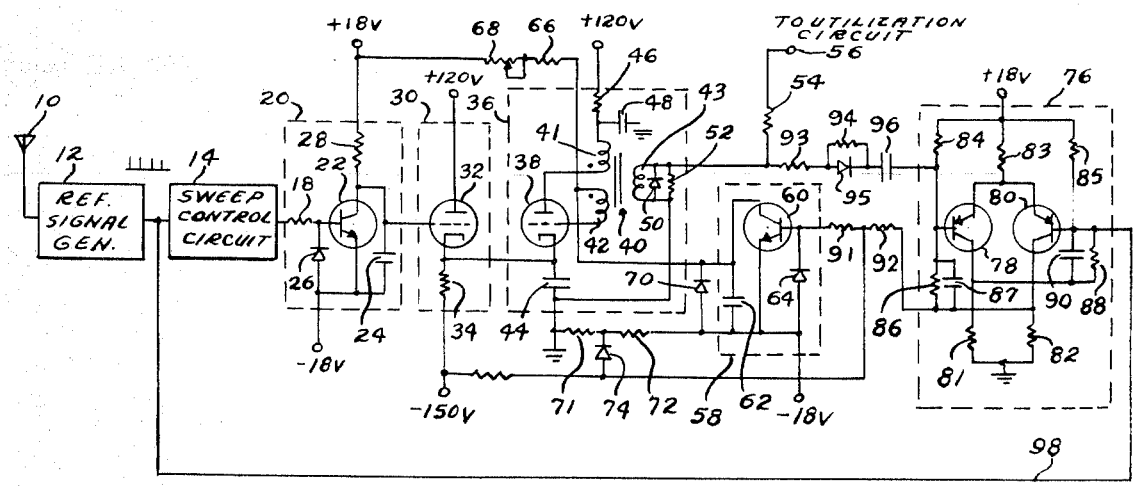

United States Patent [19]

Hassencahl

[11] 3,781,885
[45] Dec. 25, 1973

[54] MOVING RANGE GATE GENERATING SYSTEM FOR RADAR APPARATUS

[75] Inventor: Lloyd J. Hassencahl, Chatsworth, Calif.

[73] Assignee: The United States of America as represented by the Secretary of the Air Force, Washington, D.C.

[22] Filed: Jan. 13, 1965

[21] Appl. No.: 425,357

[52] U.S. Cl. ............................................. 343/7.3
[51] Int. Cl. ............................................. G01s 7/28
[58] Field of Search ........................... 343/7 A, 7.3

[56] References Cited
UNITED STATES PATENTS
3,092,831   6/1963   Mercer .............................. 343/7.3

Primary Examiner—T. H. Tubbesing
Attorney—Harry A. Herbert, Jr. and Eugene J. Pawlikowski

EXEMPLARY CLAIM

1. In a radar system for searching and tracking objects in space, a voltage comparator circuit comprising: a source of serially generated time base pulses having a predetermined pulse repetition frequency, bias means coupled to said pulse source and controlled by said pulses for deriving a control voltage extended over a predetermined duration, a first sawtooth generator biased by said control voltage to produce for said predetermined duration a sawtooth voltage encompassing a period greater in length than a plurality of periods of said pulse repetition frequency, a second sawtooth generator, multivibrator means normally having a first quiescent state and one output level and being switchable to a second state and another output level by each of said pulses, said second sawtooth generator being controlled by said multivibrator means, an input connection between said source and said multivibrator means whereby in response to the switching of said multivibrator means from said first to said second state said second sawtooth generator produces a second sawtooth voltage, a comparator having first and second input electrodes and an output electrode and characteristics of producing an output pulse on said output electrode each time the signals simultaneously applied to said input electrodes agree in amplitude, cathode follower means for applying said first sawtooth voltage to the first input electrode of said comparator, circuit means for applying said second sawtooth voltage to the second input electrode of said comparator, means connected between said output electrode and said multivibrator means for restoring the initial quiescent state of said multivibrator means upon the occurrence of said output pulses, whereby said second sawtooth voltage undergoes termination upon each reversal of said multivibrator means from said second state to said first quiescent state, the improvement lying in gradually increasing the delay between each of said output pulses and the related one of said time base pulses which spatially precedes it.

1 Claim, 2 Drawing Figures

INVENTOR
L. J. HASSENCAHL

Harry A. Herbert Jr
ATTORNEY

BY

Eugene J. Pawlikowski
AGENT

MOVING RANGE GATE GENERATING SYSTEM FOR RADAR APPARATUS

This invention relates to a range tracking system for missile acquisition of momentarily lost targets and, particularly, to a system for generating a movable range gate from fixed zero range reference pulses.

The increasing use of electronic countermeasures equipment in modern weapons systems has fostered the need for target reacquisition methods to be used at times when enemy jamming has temporarily broken the tracking lock which the guidance system of the missile has established on the target. Missile tracking and guidance systems are especially vulnerable to sustained jamming periods longer than the velocity memory servo system of the missile itself. At the cessation of jamming, a range search normally must be conducted in order to place the target again within the range gate, for during the jamming interim it is certain that the target in moving from its last known position will interrupt the tracking coincidence normally required between the target echoes and the range gate of the missile receiver.

In seeking to establish range lock-on once jamming has stopped, it is axiomatic that only the range remaining between the radar "main bang" pulse and the programmed maximum flight range of the missile should be searched. In one known system in which the missile is launched into self flight from an aircraft, the main bang pulses are defined as the plane-emitted radar pulses which illuminate the target following missile and aircraft separation. When received by a rearward-facing aft-mounted antenna disposed on the missile each main bang pulse establishes the position of the missile in space as zero search range at the instant the main bang pulse is registered. This approach avoids making a useless range search of a large area beyond the effective flight capability of the missile. Thus, at the conclusion of jamming and with the target returns no longer coincident with the occurrence of the missile range gate, the range gate must be repositioned to lock onto the target video. The present invention therefore includes the feature of slewing the missile range gate back and forth over the distance separating the missile and target until coincidence of the target video and the range gate is achieved. At this time the missile resumes tracking in the normal mode, i.e., by homing on target echo pulses as the target is illuminated by the launch plane.

Another object of the invention is to provide a system for obtaining the reacquisition of a target by a missile whose tracking lock on the target is temporarily disrupted.

A further object of the invention is the provision of a system wherein the radar main bang pulse is repetitively used as a zero range reference from which a movable range gate is generated.

Other objects will appear hereinafter.

Figure 2:
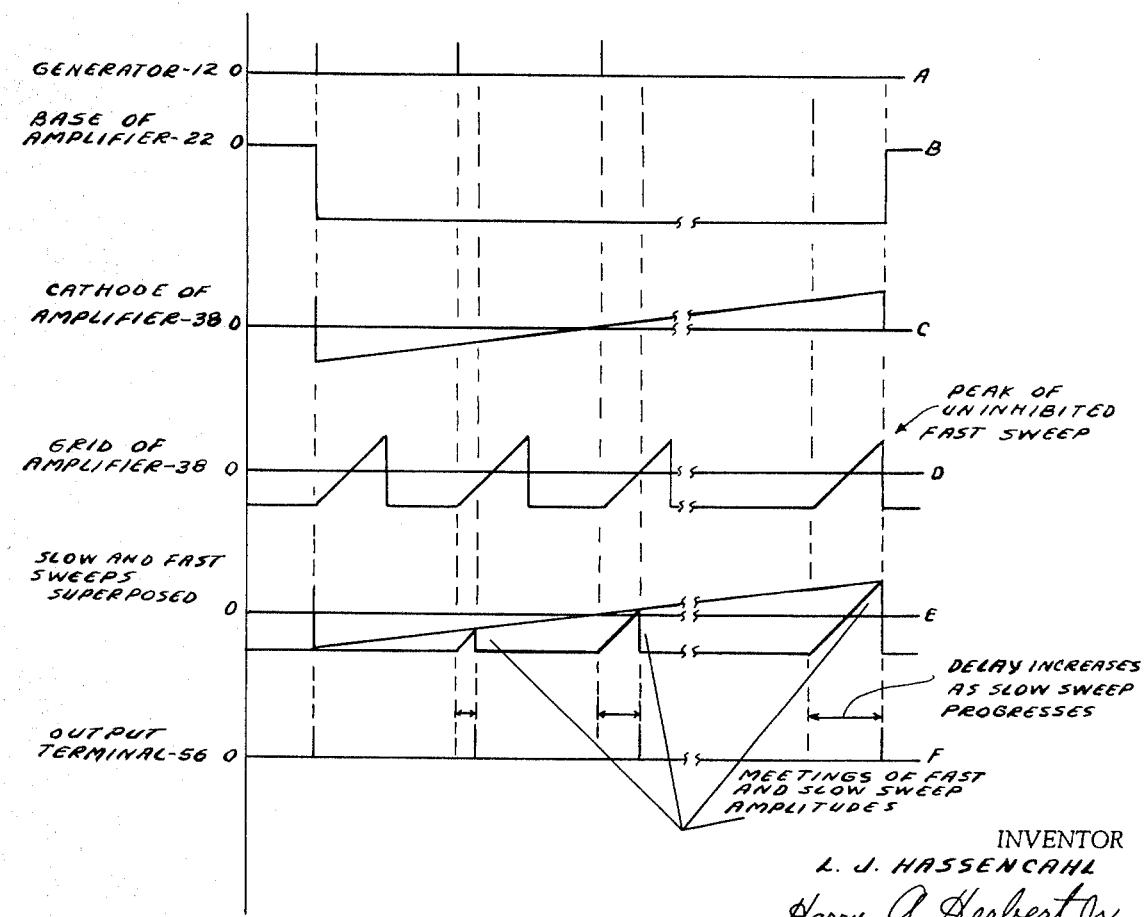

In the drawings, FIG. 1 is a schematic circuit illustrating the operation of a relock establishing system in accordance with the invention; and FIG. 2 shows waveforms useful in understanding the operation of the embodiment illustrated in FIG. 1.

Air-to-air missiles of the type in which the incorporation of the FIG. 1 embodiment is contemplated employ a front-end mounted guidance system having a dish antenna directed toward r-f energy bounced from a target illuminated by the launching aircraft during the attack run. Antenna 10, however, is a rearward-looking antenna shielded from the target-reflected energy so that it "sees" only the main bang pulse transmitted by the launch aircraft. A generator 12 fed by antenna 10 produces a single pulse output for each main bang carrier wave pulse. The train of positive pulses from generator 12 therefore is slaved to the main bang pulses. This synchronization with the main bang pulses continues as long as the missile maintains an approximate collision course with the target. With each pulse output of generator 12 coincident in time with a corresponding main bang pulse, a reference is provided from which the position of the missile relative to the target may be defined at any point in the flight geometry.

The output of generator 12 is applied to a sweep control circuit 14. The purpose of circuit 14 is to produce the waveform B of FIG. 2. This negative-going rectangular voltage pulse is initiated coincidently with a pulse from source 12, has a duration many times the pulse repetition interval of the source 12 pulses and defines the interval during which the radar range gate, in the search mode, moves from zero or minimum range to maximum range. Any suitable circuit for generating this waveform may be used for circuit 14, its design being no part of the invention. One of the best known and most widely used circuits for this purpose is the monostable multivibrator, as described for instance in Volume 17, Waveforms, of the Radiation Laboratory Series, pages 166 to 171. If a monostable multivibrator is used for circuit 14, its operation is as follows:

With the monostable multivibrator in its stable state, the next pulse to occur from source 12 triggers it to its unstable state, generating the leading negative-going edge of the rectangular wave B. The circuit remains in the unstable state, in which it is insensitive to the trigger pulses from source 12 for an interval determined by the parameters of the circuit, as described in the above reference. At the end of this interval the circuit automatically reverts to its stable state, generating the trailing positive-going edge of wave B and again becoming sensitive to the trigger pulses from source 12, the next occurring of which initiates a new cycle of operation.

The output of sweep control circuit 14 is applied through resistor 18 to the base of a slow sweep generator 20 herein shown including an NPN transistor amplifier 22. The emitter of amplifier 22 is connected directly to a unidirectional negative source (−) having, for example, a value of 18 volts. A capacitor 24 is connected between the collector and emitter of amplifier 22 for generating an exponential slow sweep voltage. For protecting the base-emitter junction of amplifier 22 from excessive reverse-direction voltage a diode 26 is provided. The collector of amplifier 22 is returned through load resistor 28 to a unidirectional positive source (+) also having, for example, a value of 18 volts.

Following amplifier 22 is a cathode-follower 30 having a triode 32 whose plate is connected to a unidirectional positive source (+) of 120 volts. Output resistor 34 returns the cathode of triode 32 to a unidirectional negative source (−) of, for example, 150 volts.

The cathode of triode 32 is connected to a conventional blocking oscillator herein generally referenced 36 and including a comparator triode amplifier 38 and an iron-core transformer 40 having windings 41, 42, and 43. High frequency bypass for amplifier 38 is provided by a capacitor 44. The plate of amplifier 38 is connected by means of winding 41 and resistor 46 to the unidirectional positive source (+) of 120 volts. Capacitor 48 and resistor 46 doubly serve as a high frequency filter between transformer 40 and the plate supply voltage. Diode 50 clamps the pulse output of oscillator 36 above ground thereby damping negative overshoot. Resistor 52 serves as a fixed load for transformer 40 to establish the output impedance for oscillator 36. Through resistor 54 the pulse output of oscillator 36 is applied to output terminal 56 and then, in any manner desired, to a suitable utilization circuit.

In the present embodiment, comparator amplifier 38 of oscillator 36 produces a short duration output pulse in response to input trigger signals from cathode follower 30 coincident with other input signals applied to its grid through winding 42. To this end, the dot-marked end of winding 42 of transformer 40 is connected to a fast sweep generator referenced generally 58 and including an NPN transistor amplifier 60. A capacitor 62 for generating an exponential fast sweep voltage is connected between the collector and emitter of amplifier 60. A diode 64 couples the base and emitter of amplifier 60 to protect against excessive reverse direction voltage.

The collector of amplifier 60 is tied to the unidirectional positive source (+) through load resistor 66 and variable resistor 68. The time constant of the fast sweep generator input to blocking oscillator 36 therefore is adjustable. By means of the variable resistance path offered by resistor 68, capacitor 62 produces a sawtooth ramp voltage always considerably shorter in duration than the slow sweep voltage developed by capacitor 24.

Diode 70 provides a low resistance path for dissipating the energy impressed on capacitor 62 each time an output pulse is generated by oscillator 36. Resistors 71 and 72 and diode 74 form a diode-clipper network to establish a maximum input voltage to the base of transistor amplifier 60.

Control of the sweep output of amplifier 60 is effected by a conventional bistable multivibrator generally referenced 76, and comprising PNP transistor amplifiers 78 and 80 arranged in common-collector configuration. The collectors of amplifiers 78 and 80 extend to ground through resistors 81 and 82, respectively. The emitters of amplifiers 78 and 80 are returned to the unidirectional positive source (+) by means of common resistor 83. Resistors 84 and 85 return the bases of amplifiers 78 and 80, respectively, to the (+) source. Transfer of the collector step voltages from one section to the other section of multivibrator 76 is due to the parallel resistor-capacitor combinations 86–87 and 88–90, as is well known in the art. To allow control of fast sweep generator 60, the collector of amplifier 80 of multivibrator 76 is connected to the base of amplifier 60 through series-connected resistors 91 and 92.

For resetting multivibrator 76, the pulse output of oscillator 36 at winding 43 is coupled to the base of amplifier 78 of multivibrator 76 through resistor 93, the parallel connection of resistor 94 and diode 95, and capacitor 96.

For initially triggering multivibrator 76 a line 98 extends from the output of generator 12 to the base of amplifier 80. In the quiescent state, amplifier 80 of multivibrator 76 is conductive whereas amplifier 78 is cut off. From conduction in amplifier 80 the voltage across resistor 82 provides a positive bias by which amplifier 60 of fast sweep generator 58 is made conductive. Capacitor 62 therefore is substantially completely discharged.

Slow sweep generator amplifier 22 is also normally biased conductive, the emitter thereby being rendered considerably negative with respect to the base thereof. By the same rationale, quiescently capacitor 24 is substantially completely discharged through amplifier 22.

The operation of the circuit of FIG. 1 to provide a train of range gate pulses referenced successively to the main bang pulses will be more apparent from the idealized curves of FIG. 2. Referring to curves A through F in FIG. 2, the horizontal axis is taken as the time axis and the vertical axis as the amplitude axis. Ground reference is represented as zero amplitude. FIG. 2A represents a series of pulses found at the output of generator 12. Each pulse there shown enjoys time coincidence with a companion main bang pulse received from the launch aircraft. The idealized step voltage represented by FIG. 2B is the output of sweep control circuit 14 subsequent to the application of the input voltage from generator 12. Although no single and absolute value is reserved in the present invention for the selection of a maximum search range, a maximum search range of roughly 27,500 feet from the missile is established with the maximum delay of the output pulses at terminal 56 (waveform F of FIG. 2) relative to their associated trigger pulses from source 12 set at 55 microseconds. This means that at commencement of the sweep control voltage of FIG. 2B, the in-flight position of the missile at this instant is based at zero, i.e., each range search proceeds from this instantaneous zero range position.

The base-emitter junction of amplifier 22 is reverse-biased by the output voltage of sweep control circuit 14. Amplifier 22 is driven from conduction into cutoff. Capacitor 24 begins to charge exponentially to the rapidly rising collector voltage of amplifier 22. This change is shown in FIG. 2C. Without inversion, the slow sweep voltage is applied to the cathode of amplifier 38. The fast sweep voltage from capacitor 62 at amplifier 60 commences at the same time. The sharp pulse at the base of amplifier 80 of multivibrator 76 drives amplifier 80 from conduction into cutoff. Immediately, as well known in the art, amplifier 78 becomes forward-biased and begins to conduct heavily. The voltage at the collector of amplifier 80 increases negatively to the point that a reverse-bias potential is applied to amplifier 60 of fast sweep generator 58. Overcome by this change in bias potential, amplifier 60 has a rapid reduction of collector current. The voltage on capacitor 62 now rises exponentionally in a positive direction. FIG. 2D shows the fast sweep waveform of generator 58 as it would appear were the sweep permitted to increase uninhibitedly each cycle to its peak value. Thus, one input to the cathode of amplifier 38 is a positive slow rising ramp developed by slow sweep generator. The second input applied to the grid is a positive-going ramp from fast sweep generator 58. It is apparent that the level to which the fast sweep voltage each time must rise to trigger amplifier 38 into conduction depends on the instantaneous level of the slow sweep sawtooth from slow sweep generator 20. Stated differently, the slow sweep voltage of generator 20 provides for oscillator 36 a reference voltage of progressively increasing amplitude. Since the amplitude of the slow sweep voltage is steadily increasing, this means that the fast sweep voltage must rise to a higher level each time to trigger amplifier 38 into conduction and thus produce an output pulse at terminal 56. For each output pulse of oscillator 36 illustrated in FIG. 2F, the amplitudes of the waveforms of FIGS. 2C and 2D are substantially in coincidence.

Further, each output pulse from oscillator 36 is applied to the base of amplifier 78 of multivibrator 76 to extinguish the fast sweep voltage. WIth the application of the positive pulse to its base electrode, amplifier 78 reverts to its non-conducting state. In turn, amplifier 80 is induced to conduct once again. The sudden precipitous increase in collector current therein impresses a positive-going voltage onto the base of amplifier 60 of the fast sweep generator. The voltage on capacitor 62 is then discharged through amplifier 60 upon its return to the conductive state. As viewed by the grid of amplifier 38 quiescent conditions are thus reestablished. The cessation of the fast sweep voltage upon each amplitude coincidence of the fast and slow sweep waveforms therefore is abundantly clear. This effect is illustrated in FIG. 2E which shows the actual fast and slow sweeps superposed.

Throughout FIG. 2, the vertical dashed lines indicate time correspondence. Accordingly, in accordance with the invention, it will be observed that the crossover points of the fast and slow sweep voltages occur gradually later in the cycle of the slow sweep ramp. The result, of course, is to impose an ever increasing delay between the output pulses of oscillator 36 and their related main bang pulses.

Upon the termination of the slow sweep control voltage from circuit 14 amplifier 22 reverts to the conductive state. As conduction begins in amplifier 22, capacitor 24 is afforded a discharge path, rapidly doing so through the collector-emitter circuit. Another slow sweep voltage is initiated by placing amplifier 22 in the cutoff condition.

The variable time constant in the charging path of capacitor 62 provides a means whereby more or fewer output pulses may be obtained during the duration of the slow sweep voltage. Further, capacitor 62 recovers promptly through amplifier 60 to be ready to produce the next fast sweep waveform.

In a missile control system as thus outlined hereinabove, it is presupposed that a reduced range exists between the missile and target subsequent to the advent of jamming. Assuming no target detection at the cessation of jamming, one proposed use of the output pulses illustrated in FIG. 2F is to restore the range gate of the missile to time coincidence with target returns. By thus introducing a progressively larger delay between each main bang pulse and the onset of each related range gate pulse, the receptivity of the receiving section of the missile will be stepped outwardly once the main bang pulse occurs, and then again be retraced to the main bang pulse whereupon another slow sweep cycle is initiated etc. until the shifting range gate brackets the target video returns. Said differently, one advantage embodying the invention is that the missile range gate may be programmed to "step" outwardly from the zero range position until a target is acquired or maximum range is reached. When the range gate becomes coincident with the target video signal, presumably still located between the main bang pulse and the predetermined maximum range, normal tracking will resume. Subsequently received target returns will remain centered within the receiver range gate.

Although only one embodiment of the invention has herein been illustrated and described, it will be apparent to those skilled in the art that various changes and modifications can be made herein without departing from the spirit of the invention or the scope of the appended claims.

I claim:

1. In a radar system for searching and tracking objects in space, a voltage comparator circuit comprising: a source of serially generated time base pulses having a predetermined pulse repetition frequency, bias means coupled to said pulse source and controlled by said pulses for deriving a control voltage extended over a predetermined duration, a first sawtooth generator biased by said control voltage to produce for said predetermined duration a sawtooth voltage encompassing a period greater in length than a plurality of periods of said pulse repetition frequency, a second sawtooth generator, multivibrator means normally having a first quiescent state and one output level and being switchable to a second state and another output level by each of said pulses, said second sawtooth generator being controlled by said multivibrator means, an input connection between said source and said multivibrator means whereby in response to the switching of said multivibrator means from said first to said second state said second sawtooth generator produces a second sawtooth voltage, a comparator having first and second input electrodes and an output electrode and characteristics of producing an output pulse on said output electrode each time the signals simultaneously applied to said input electrodes agree in amplitude, cathode follower means for applying said first sawtooth voltage to the first input electrode of said comparator, circuit means for applying said second sawtooth voltage to the second input electrode of said comparator, means connected between said output electrode and said multivibrator means for restoring the initial quiescent state of said multivibrator means upon the occurrence of said output pulses, whereby said second sawtooth voltage undergoes termination upon each reversal of said multivibrator means from said second state to said first quiescent state, the improvement lying in gradually increasing the delay between each of said output pulses and the related one of said time base pulses which spatially precedes it.

* * * * *